(12) United States Patent
Chen et al.

(10) Patent No.: US 12,443,248 B2
(45) Date of Patent: Oct. 14, 2025

(54) GRAPHICS CARD EXPANSION DEVICE AND MOBILE TERMINAL

(71) Applicants: HONGFUJIN PRECISION INDUSTRY (WUHAN) CO., LTD., Wuhan (CN); HON HAI PRECISION INDUSTRY CO., LTD., New Taipei (TW)

(72) Inventors: Ching-Jou Chen, New Taipei (TW); Wen-Hsiang Hung, New Taipei (TW); Chun-Bao Gu, Yantai (CN)

(73) Assignees: HONGFUJIN PRECISION INDUSTRY (WUHAN) CO., LTD., Wuhan (CN); HON HAI PRECISION INDUSTRY CO., LTD., New Taipei (TW)

(*) Notice: Subject to any disclaimer, the term of this patent is extended or adjusted under 35 U.S.C. 154(b) by 301 days.

(21) Appl. No.: 18/236,851

(22) Filed: Aug. 22, 2023

(65) Prior Publication Data
US 2024/0069608 A1  Feb. 29, 2024

(30) Foreign Application Priority Data
Aug. 31, 2022  (CN) .......................... 202222331781.5

(51) Int. Cl.
*G06F 1/18* (2006.01)

(52) U.S. Cl.
CPC .................................... *G06F 1/185* (2013.01)

(58) Field of Classification Search
CPC ........................................................ G06F 1/18
See application file for complete search history.

(56) References Cited

U.S. PATENT DOCUMENTS

2009/0164685 A1* 6/2009 Chen ..................... G06F 3/0661
  710/301
2015/0294434 A1* 10/2015 Nataros ............... G06F 13/4221
  345/520

* cited by examiner

*Primary Examiner* — Jerry Wu
(74) *Attorney, Agent, or Firm* — ScienBiziP, P.C.

(57) ABSTRACT

The present application provides a graphics card expansion device. The graphics card expansion device includes a main chassis and an expansion chassis. The expansion chassis comprises: at least one graphics card storage box, the at least one graphics card storage box is equipped with at least one graphics card; at least one second power source, the at least one second power source provides power to at least one graphics card in the at least one graphics card storage box; at least one adapter card, the at least one graphics card storage box communicates with the motherboard in the main box through the at least one adapter card.

11 Claims, 6 Drawing Sheets

GRAPHICS CARD EXPANSION DEVICE AND MOBILE TERMINAL

CROSS-REFERENCE TO RELATED APPLICATIONS

This application claims all benefits under 35 U.S.C. § 119 from the Chinese Patent Application No. 202222331781.5, filed on Aug. 31, 2022, in the China National Intellectual Property Administration, the disclosure of which is incorporated herein by reference.

FIELD

The present application relates to a graphics card expansion device and a mobile terminal.

BACKGROUND

In computer workstation products, the traditional design is to set different types of graphic cards in a host computer. With the increasing demand for the number of graphic cards and the higher requirements for the performance of graphics cards, the power consumption of graphics cards is also increasing, which brings great troubles and challenges to the planning of the overall system space.

With the increasingly sophisticated development of GPU process capabilities, a density of semiconductor transistors is getting higher and higher, and heat is also getting higher and higher. The traditional design of all in one system has been unable to solve the problems of power source and heat dissipation.

BRIEF DESCRIPTION OF THE DRAWINGS

In order to illustrate the technical solutions of the embodiments of the present application more clearly, the accompanying drawings in the embodiments will be briefly introduced below. It should be understood that the following drawings only show some embodiments of the present application, and therefore should not be seen as limiting the scope. For one of ordinary skill in the art, other related drawings can also be obtained from these drawings without any creative work.

Implementations of the present technology will now be described, by way of embodiments, with reference to the attached figures, wherein.

DETAILED DESCRIPTION

Figure 1:
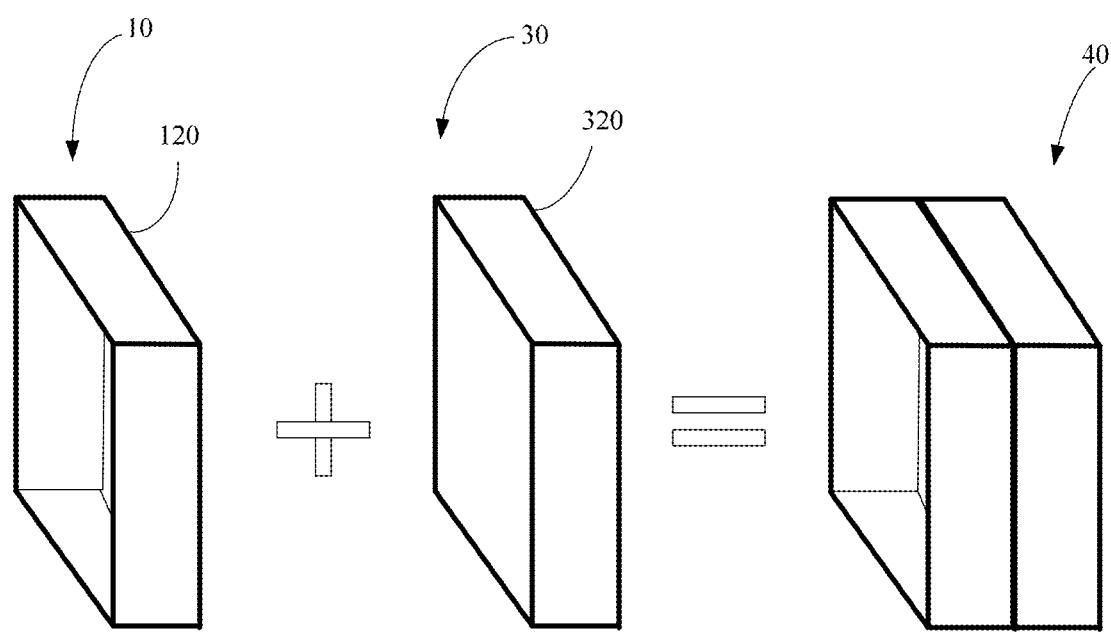
FIG. 1 is a schematic diagram of an exploded structure of a graphics card expansion device provided by a first embodiment of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated better illustrate details and features. The description is not to be considered as limiting the scope of the embodiments described herein.

The term "outside" refers to a region that is beyond the outermost confines of a physical object. The term "inside" indicates that at least a portion of a region is partially contained within a boundary formed by the object. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

Figure 2:
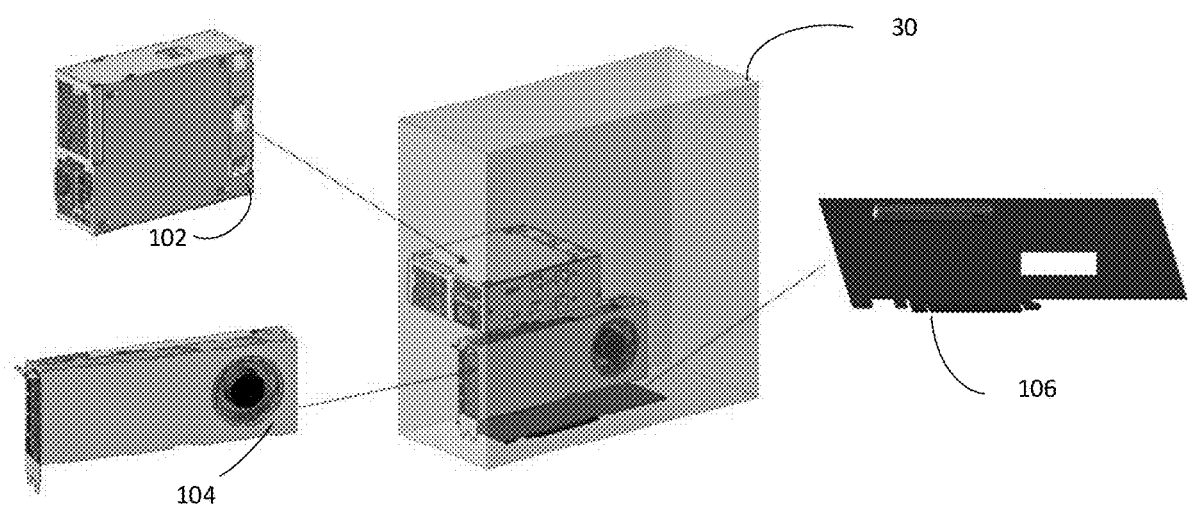
FIG. 2 is a disassembled structure diagram of an expansion chassis in the graphics card expansion device in the first embodiment of the present invention.

Please refer to FIG. 1 and FIG. 2, a first embodiment of the present invention provides a graphics card expansion device. The graphics card expansion device includes a main chassis and an expansion chassis. The main chassis and the expansion chassis are arranged side by side. Sizes of the main chassis and the expansion chassis can be the same or different. A height and a depth of the expansion chassis can be consistent with the main chassis. A width of the expansion chassis can be adjusted according to actual needs. In the first embodiment, sizes of the main chassis and the expansion chassis are the same, and the bottom plate of the main chassis and the bottom plate of the expansion chassis are fixed together to form the graphics card expansion device. It can be understood that, the main chassis and the expansion chassis can also share a bottom plate. A motherboard and a first power source are arranged in the main chassis. The expansion chassis includes at least one graphics card storage box and at least one second power source. The at least one graphics card storage box includes at least one graphics card. The expansion chassis further includes at least one adapter card. The graphics card in the at least one graphics card storage box communicates with the motherboard in the main chassis through the at least one adapter card. The second power source provides energy to the at least one graphics card.

Figure 3:
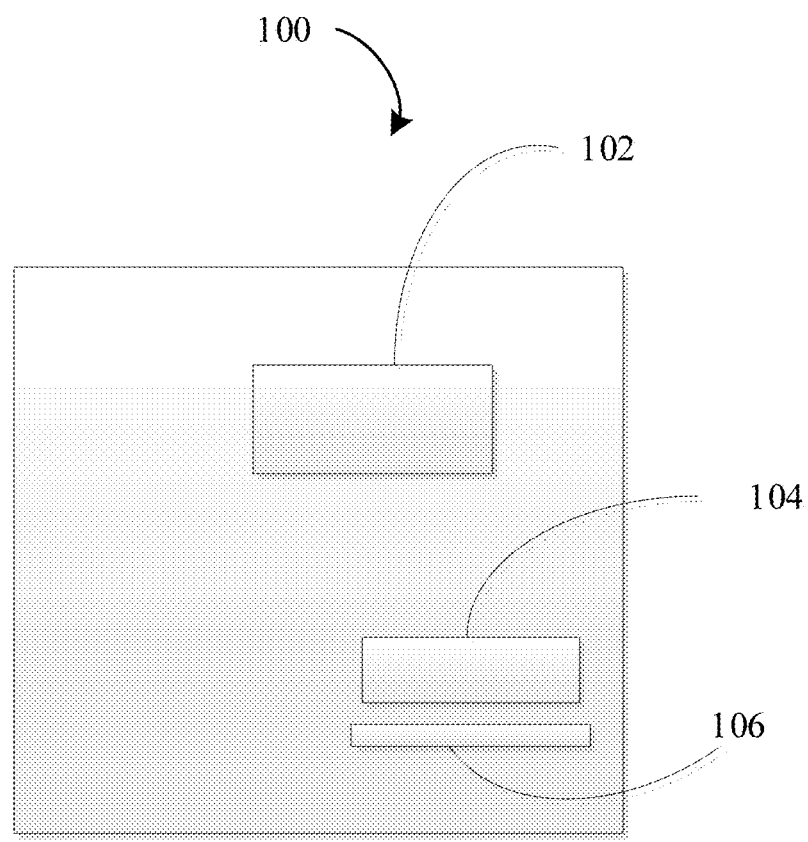
FIG. 3 is a schematic diagram of internal structure modules of the expansion chassis provided by the first embodiment of the present invention.

Please refer to FIG. 3, the expansion chassis 100 of the first embodiment includes a second power source 102, a graphics card storage box 104 and an adapter card 106. The second power source 102, the graphics card storage box 104 and the adapter card 106 are all fixed on the bottom plate of the expansion chassis 100. The positions of the second power source 102, the graphics card storage box 104 and the adapter card 106 are not limited.

The graphics card storage box 104 can include one graphics card or multiple graphics cards. The graphics card storage box 104 includes a card slot for fixing the graphics card. When the graphics card storage box 104 includes multiple graphics cards, the multiple graphics cards can be different types of graphics cards, or can be the same graphics card. In this embodiment, the graphics card storage box 104 includes a graphics card, and the graphics card is fixed in the graphics card storage box 104 through the card slot.

The second power source 102 is used to provide electrical energy to the graphics card. When the extension chassis 100 includes multiple second power sources 102, the multiple second power sources 102 can be different power sources or the same power source, which can be set according to actual needs.

The adapter card 106 is used to communicate and connect the one or more graphics cards with the motherboard in the main chassis. A number of the adapter card 106 can be one or multiple.

The expansion chassis 100 includes a casing (not shown in the figure), and the bottom plate of the expansion chassis is a part of the casing. An accommodating chamber is formed in the casing, and the second power source 102, the graphics card accommodating box 104 and the adapter card 106 are all arranged in the accommodating chamber and fixed on the bottom plate of the expansion chassis. The casing supports and protects the second power source 102, the graphics card storage box 104 and the adapter card 106, and also has the function of dustproof and waterproof.

The expansion chassis 100 can further include a heat dissipation device (not shown in the figure), and the heat dissipation device is in thermal contact with the at least one graphics card. The heat dissipation device is used for dissipating the heat generated by the graphics card, so that the at least one graphics card has good operating performance. The heat dissipation device can be a heat dissipation module. The heat dissipation module includes a heat pipe, a heat sink and a fan, wherein the heat pipe is in heat transfer contact with the at least one graphics card, and the heat sink is installed on the heat pipe and is air-cooled by the fan.

The number of the second power source in the expansion chassis 100 provided by the utility model is not limited, it can be one or multiple. The second power source 102 can provide power to a graphics card and a adapter card, and can also provide power to multiple graphics cards and multiple adapter cards.

The graphics card expansion device provided by the invention further includes an expansion box in addition to the main chassis, and there is an independent second power source in the expansion box, and the independent second power source provides energy for the graphics card in the expansion chassis. There is the power source problem existing in the technology; at the same time, since the graphics card is arranged in the expansion chassis instead of being located in the host computer, it does not bring heat to the host computer and solves the heat dissipation problem of the host computer.

Figure 4:
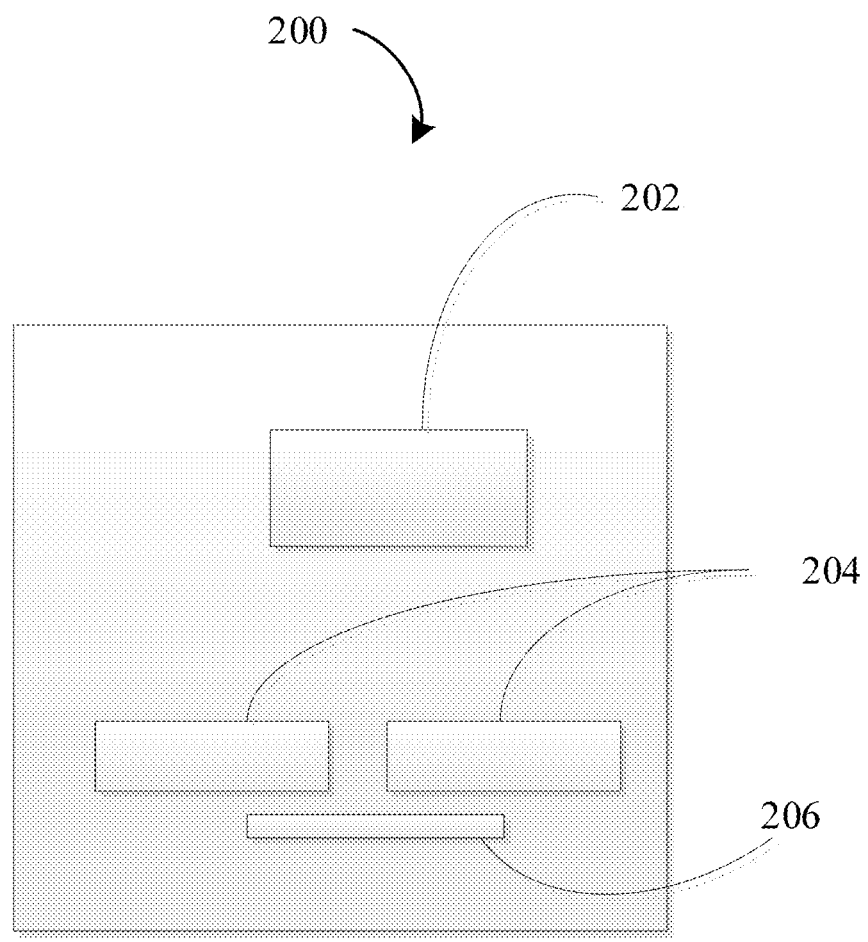
FIG. 4 is a schematic diagram of internal structure modules of the expansion chassis provided by a second embodiment of the present invention.

The second embodiment of the present invention provides a graphics card expansion device. The graphics card expansion device includes an expansion chassis. Please refer to FIG. 4, the expansion chassis 200 includes a second power source 202, two graphics card storage boxes 204 and an adapter card 206. The second power source 202 provides power to the graphics cards in the two graphics card storage boxes 204. The adapter card 206 is used to communicate and connect the graphics cards in the two graphics card storage boxes 204 with the motherboard.

Positions of the two graphics card storage boxes 204 are not limited, they can be arranged at intervals, or they can be in contact with each other. Each graphics card storage box 204 includes at least one graphics card (not shown). In this embodiment, three graphics cards are set in each graphics card storage box 204.

Except for the above-mentioned features, other features of the graphics card expansion device provided by the second embodiment of the present invention are the same as those of the graphics card expansion device provided by the first embodiment.

Figure 5:
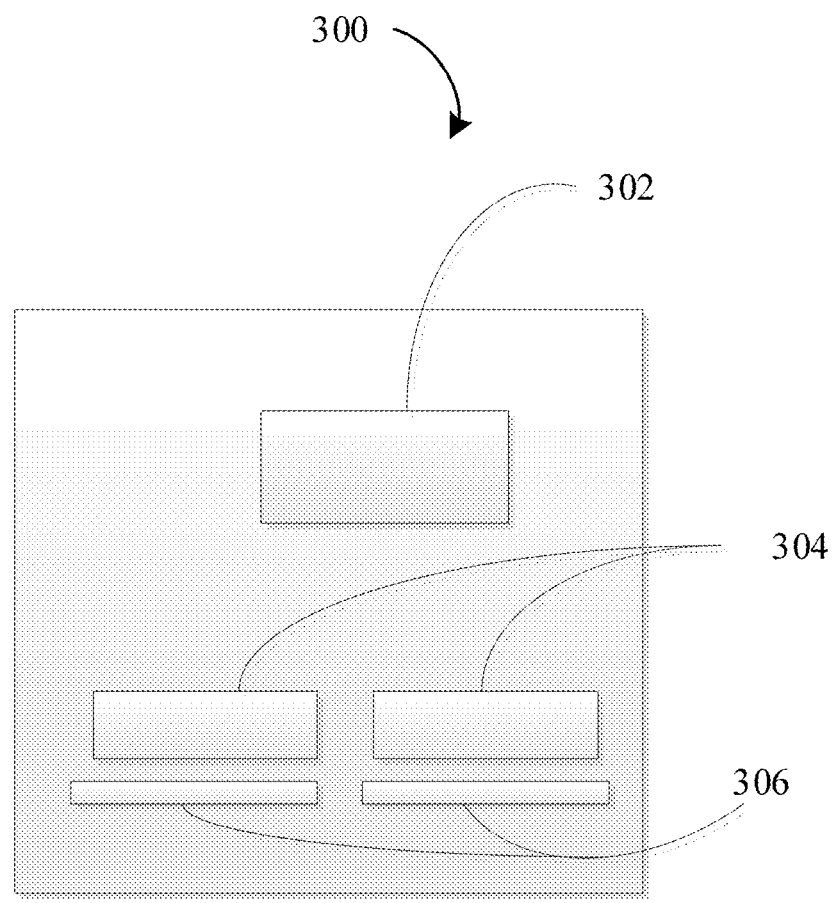
FIG. 5 is a schematic diagram of the internal structure modules of the expansion chassis provided by a third embodiment of the present invention.

The third embodiment of the present invention provides a graphics card expansion device. The graphics card expansion device includes an expansion chassis. Referring to FIG. 5, the expansion chassis 300 includes a second power source 302, two graphics card storage boxes 304 and two adapter cards 306. The second power source 302 provides power to the graphics cards in the two graphics card storage boxes 304. The two adapter cards 306 are used to communicate and connect the graphics cards in the two graphics card storage boxes 304 with the motherboard.

The two graphics card storage boxes 304 and the two adapter cards 306 are in a one-to-one correspondence. The positions of the two adapter cards 306 are not limited, they can be arranged at intervals, or they can be in contact with each other. Each graphics card storage box 304 includes at least one graphics card (not shown). In this embodiment, two graphics cards are set in each graphics card storage box 304.

Except for the above-mentioned features, other features of the graphics card expansion device provided by the third embodiment of the present invention are the same as those of the graphics card expansion device provided by the first embodiment.

Figure 6:
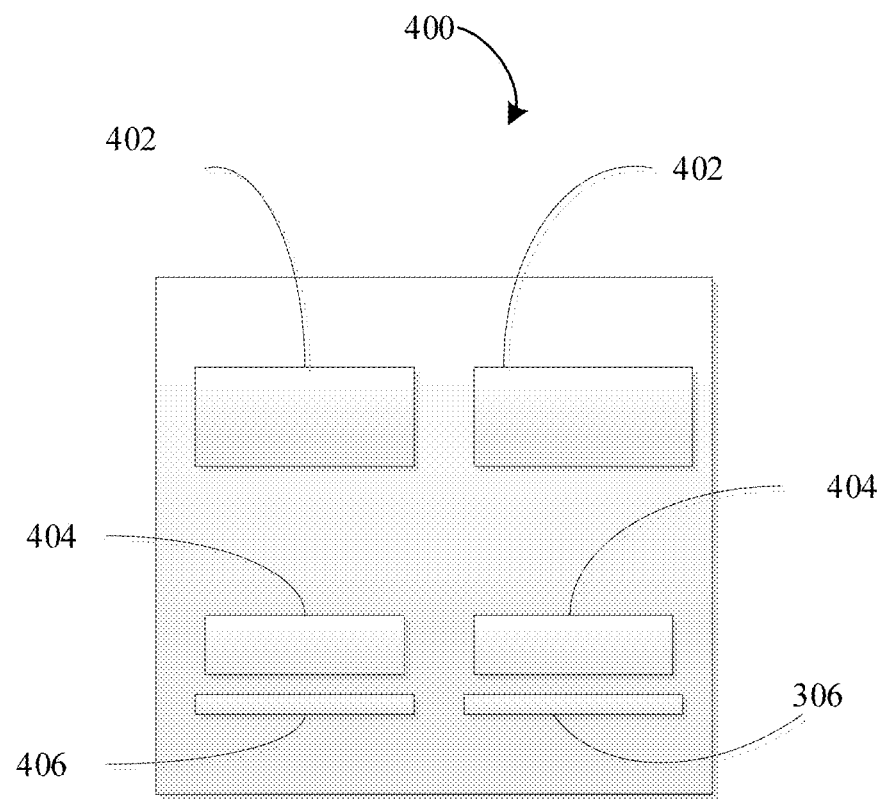
FIG. 6 is a schematic diagram of the internal structure modules of the expansion chassis provided by a fourth embodiment of the present invention.

The fourth embodiment of the present invention provides a graphics card expansion device. The graphics card expansion device includes an expansion chassis. Referring to FIG. 6, the expansion chassis 400 includes two second power supplies 402, two graphics card storage boxes 404 and two adapter cards 406. The second power source 402, the graphics card storage box 404 and the adapter card 406 are provided in one-to-one correspondence. That is, a second power source 402 provides power to a graphics card in a graphics card storage box 404. A graphics card storage box 404 is communicatively connected with the motherboard through an adapter card 406.

The two second power sources 402 are arranged at intervals. Each graphics card storage box 404 includes at least one graphics card (not shown). In this embodiment, two graphics cards are set in each graphics card storage box 404.

Except for the above features, the graphics card expansion device provided by the fourth embodiment of the present invention has the same features as the graphics card expansion device provided by the first embodiment.

The present invention further provides a mobile terminal, which adopts the above-mentioned graphics card expansion device. The mobile terminal includes, but is not limited to, a notebook computer, a tablet computer, a mobile phone, and the like.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

Depending on the embodiment, certain of the steps of methods described may be removed, others may be added, and the sequence of steps may be altered. The description and the claims drawn to a method may comprise some indication in reference to certain steps. However, the indication used is only to be viewed for identification purposes and not as a suggestion for ordering the steps.

What is claimed is:

1. A graphics card expansion device, comprising: a main chassis comprising a motherboard and a first power source; an expansion chassis, wherein the expansion chassis comprises: at least one graphics card storage box, the at least one graphics card storage box is equipped with at least one graphics card; at least one second power source, the at least second power source provides power to at least one graphics card in the at least one graphics card storage box; at least one adapter card, the at least one graphics card storage box communicates with the motherboard in the main box through the at least one adapter card; and the expansion chassis comprises a plurality of second power sources, a plurality of graphics card storage boxes, and a plurality of adapter cards, and the plurality of second power sources, the plurality of multiple graphics card storage boxes and the plurality of adapter cards are arranged in a one-by-one manner.

2. The graphics card expansion device of claim 1, wherein the main chassis and the expansion chassis are arranged side by side and pasted together.

3. The graphics card expansion device of claim 1, wherein the main chassis and the expansion chassis have a same size.

4. The graphics card expansion device of claim 3, wherein the main chassis comprises a bottom plate, the bottom plate and the expansion chassis are fixed together.

5. The graphics card expansion device of claim 1, wherein the expansion chassis comprises a plurality of graphics card storage boxes, and each graphics card storage box comprises a plurality of graphics cards.

6. The graphics card expansion device of claim 5, wherein the at least one second power source provides power to the plurality of graphics cards.

7. The graphics card expansion device of claim 5, wherein the plurality of graphics cards in the plurality of graphics card storage boxes are communicatively connected to the motherboard through an adapter card.

8. The graphics card expansion device of claim 1, wherein the expansion chassis comprises a heat dissipation device, and the heat dissipation device is thermally connected to the at least one graphics card.

9. A mobile terminal comprising a graphics card expansion device, comprising: a main chassis comprising a motherboard and a first power source; an expansion chassis, wherein the expansion chassis comprises: at least one graphics card storage box, the at least one graphics card storage box is equipped with at least one graphics card; at least one second power source, the at least second power source provides power to at least one graphics card in the at least one graphics card storage box; at least one adapter card, the at least one graphics card storage box communicates with the motherboard in the main box through the at least one adapter card; and the expansion chassis comprises a plurality of second power sources, a plurality of graphics card storage boxes, and a plurality of adapter cards, and the plurality of second power sources, the plurality of multiple graphics card storage boxes and the plurality of adapter cards are arranged in a one-by-one manner.

10. The mobile terminal of claim 9, wherein the mobile terminal is a notebook computer, a tablet computer or a mobile phone.

11. The mobile terminal of claim 9, wherein the main chassis and the expansion chassis have a same size, the main chassis comprises a bottom plate, the bottom plate and the expansion chassis are fixed together.

* * * * *